Nov. 13, 1934. C. H. WETZEL Re. 19,373

FOLDING GRANDSTAND

Original Filed Nov. 1, 1932 4 Sheets-Sheet 1

Inventor:
Charles H. Wetzel
by his Attorneys
Howson & Howson

Nov. 13, 1934. C. H. WETZEL Re. 19,373

FOLDING GRANDSTAND

Original Filed Nov. 1, 1932 4 Sheets-Sheet 2

Inventor:—
Charles H. Wetzel
by his Attorneys
Howson & Howson

Nov. 13, 1934. C. H. WETZEL Re. 19,373

FOLDING GRANDSTAND

Original Filed Nov. 1, 1932 4 Sheets-Sheet 3

Inventor:—
Charles H. Wetzel
by his Attorneys
Howson & Howson

Nov. 13, 1934. C. H. WETZEL Re. 19,373

FOLDING GRANDSTAND

Original Filed Nov. 1, 1932 4 Sheets-Sheet 4

Inventor:—
Charles H. Wetzel
by his Attorneys
Howson & Howson

Reissued Nov. 13, 1934 Re. 19,373

UNITED STATES PATENT OFFICE 19,373

FOLDING GRANDSTAND

Charles H. Wetzel, Wayne, Pa.

Original No. 1,964,612, dated June 26, 1934, Serial No. 640,709, November 1, 1932. Application for reissue August 7, 1934, Serial No. 738,885

40 Claims. (Cl. 189—1)

This invention relates to new and useful improvements in folding structures and particularly to folding structures for grandstands and the like.

The principal object of the invention is to provide a structure of the character set forth which may be folded or set up at will, and when in the former relation, will occupy a relatively small, compact area.

Another object of the invention is to provide a foldable structure of the character set forth which may be either wholly or in part set up or folded as may be desired.

Another object of the invention is to provide a structure of the character described having novel means associated therewith for locking the structure in its folded position.

A further object of the invention is to provide a structure of the general character described having a novel spring arrangement associated therewith to facilitate folding and setting up of said structure.

A still further object of the invention is to provide a structure of the character set forth which is of relatively simple, rugged construction, capable of withstanding wear, whereby the factor of safety is relatively high.

Other features and details of the invention are set forth hereinafter and disclosed in the accompanying drawings, in which:

Fig. 6 is an enlarged fragmentary view in perspective on line 6—6, Fig. 3;

Fig. 7 is an enlarged fragmentary view on line 7—7, Fig. 4; and

Fig. 8 is a view on line 8—8, Fig. 6.

Figure 1:
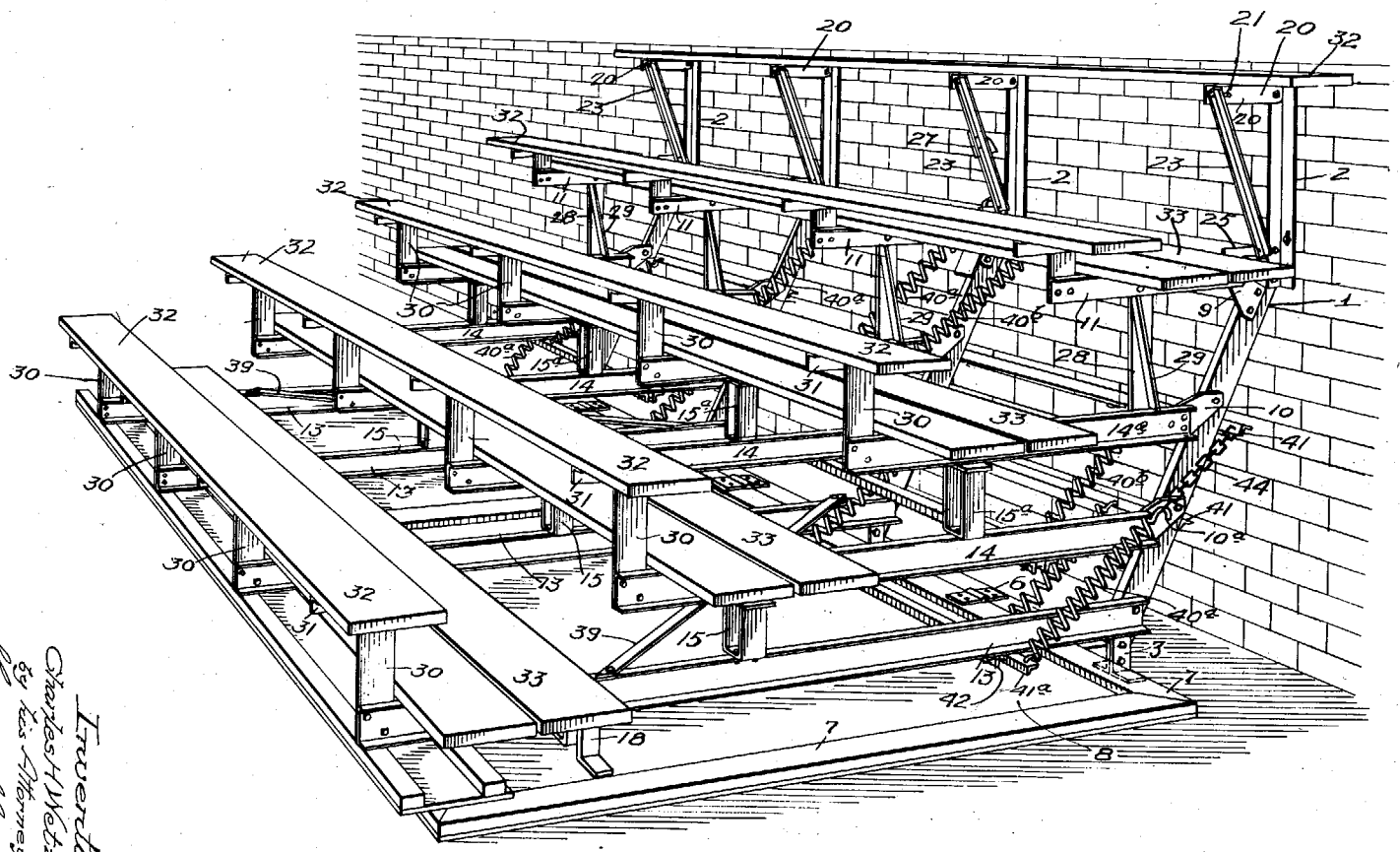
Figure 1 is a view in perspective of the structure constituting the present invention when in the unfolded or set-up position.

In recent years the use of structural frames for supports for grandstands and the like, has become increasingly prevalent and this use has become substantially universal indoors as well as out of doors to provide compact seating facilities for a large number of persons for basket-ball, volley-ball and like court games. In many of the educational institutions the gymnasium and basketball and like courts are housed in the same room or enclosure, and in order to provide adequate seating facilities for spectators at games played thereon, permanent, or bulky portable stands have been required, necessitating troublesome removal of the structure when it is desired to be availed of the entire or surrounding floor space for other purposes.

By the present invention a novel folding stand structure is provided which may be readily set up to afford compact seating facilities for a large number of people, and which, when not in use for this purpose, may be folded into a relatively small, compact area by a single person, eliminating the necessity for complete removal from the floor and rendering the portion of the floor occupied by it when set up, available for other desired uses. The present structure is of rugged, simple construction and embodies a substantially high factor of safety to render it acceptable for use in such instances.

Referring now more particularly to the drawings, the structure constituting the present invention comprises a plurality of inclined stringer members 1 secured to the lower extremity of each of a number of vertically positioned angle members 2 and at their lower ends secured intermediate the vertically disposed flanges of opposed L members 3, which are in turn secured on the floor or a fixed base element 4. A similar base member 5 is hinged longitudinally with respect to the member 4, as at 6, and a base structure comprising the ribs 7 and panelling 8 is pivotable therewith, the purpose of which will be set forth hereinafter.

Figure 2:
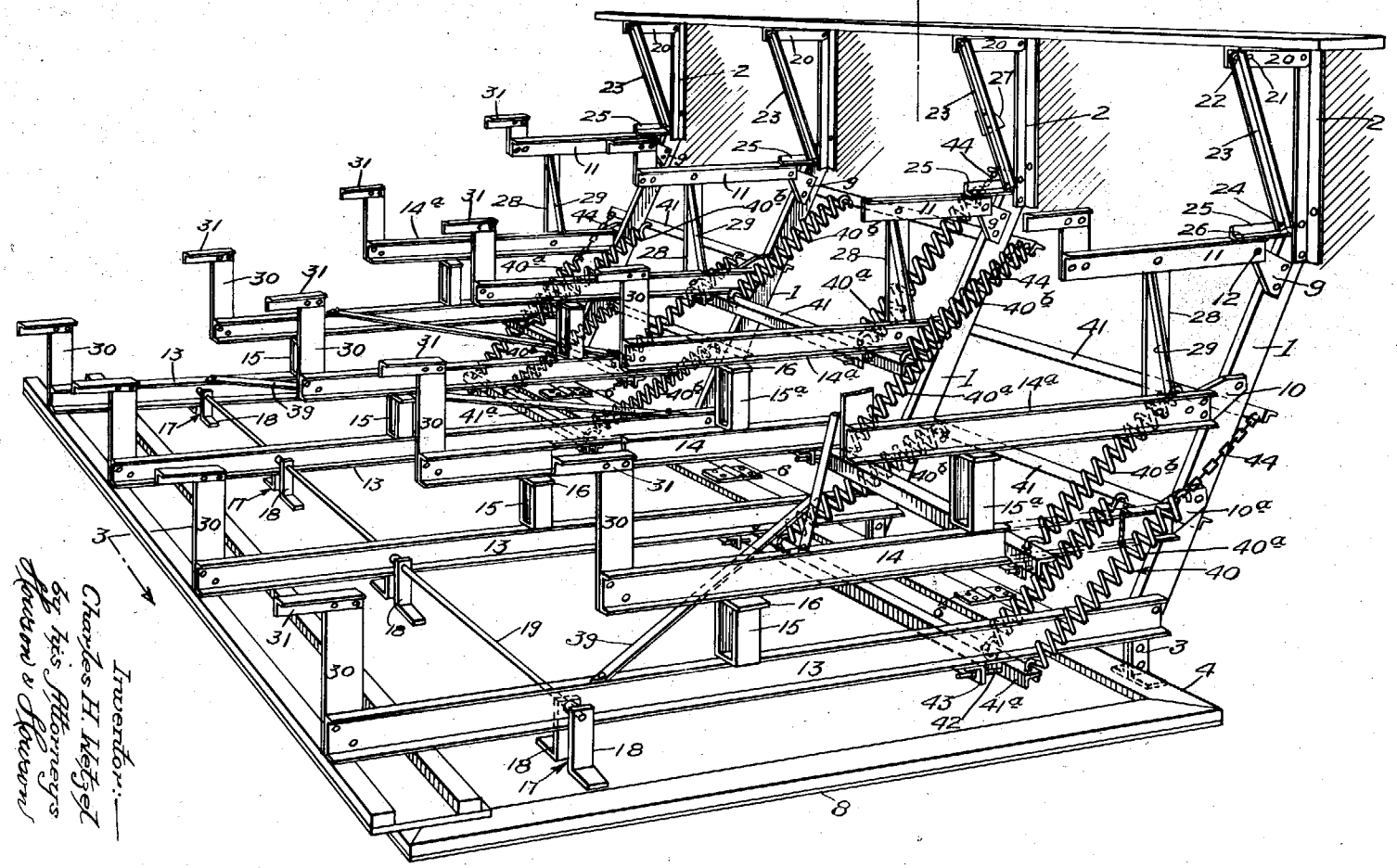
Fig. 2 is a view in perspective similar to the description in Fig. 1 having certain parts thereof cut away to better illustrate the novel spring suspension facilitating setting up or folding of the structure.

A structural plate 9 is rigidly secured to each stringer 1 and similar plates 10, 10*a* are pivotally mounted thereon as shown in Fig. 2 of the drawings. A beam 11 in the form of a channel or other structural shape is pivotally connected adjacent the opposite end of the plate 9 as at 12, and a similar but somewhat longer beam 13 is pivotally connected directly to the stringer 1 adjacent its lower end.

Figure 4:
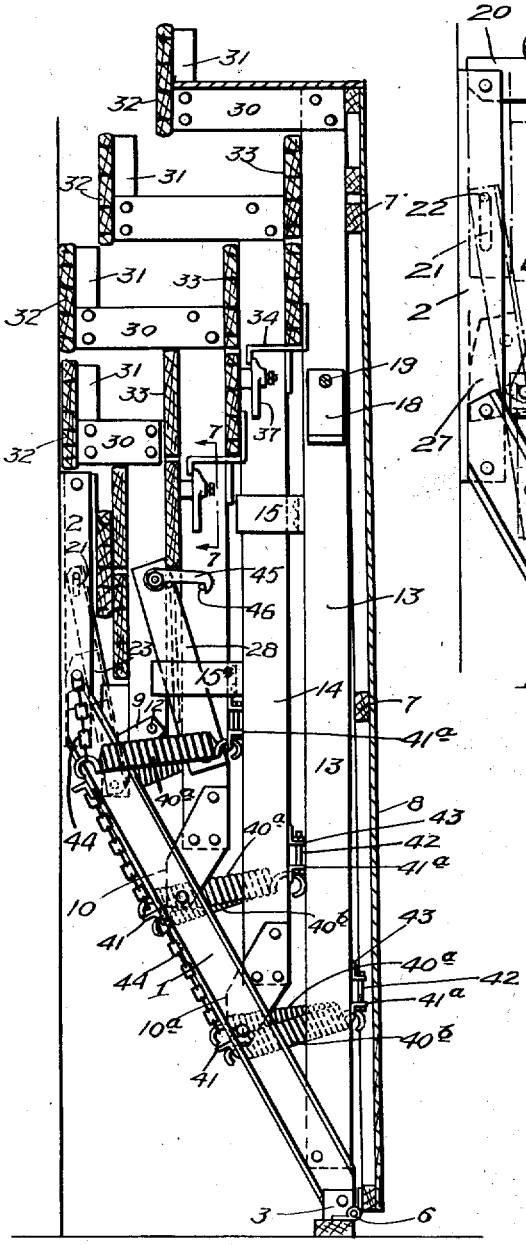
Fig. 4 is a vertical view in section showing the structure of the present invention when folded.
Figure 5:
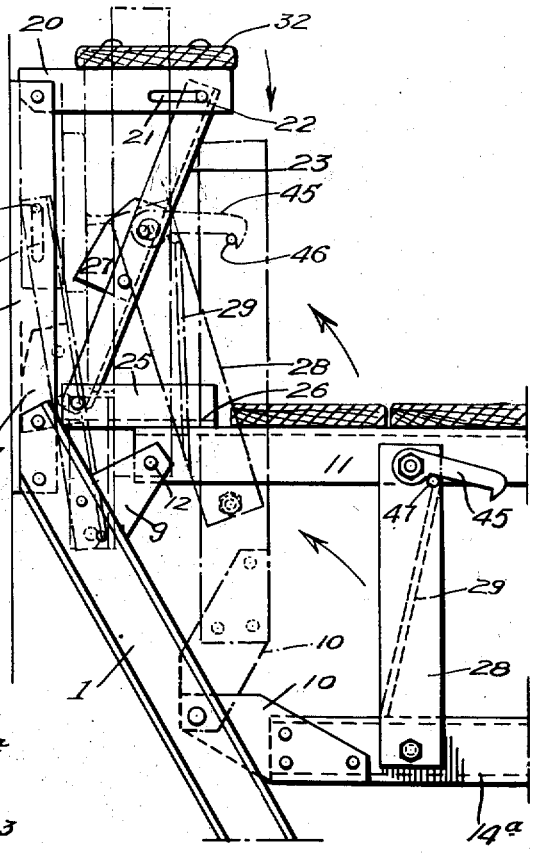
Fig. 5 is an enlarged fragmentary view of the upper portion of the disclosure in Fig. 3, showing in addition, by means of dotted lines, the position of the structural members when in folded relation.

Intermediate beams 14, 14*a* of relative lengths are rigidly secured to the extended portions of the pivotally mounted plates 10, 10*a* and U members 15, 15*a* are rigidly secured to the upper faces respectively of each of the channels 13 and 14. In the present instance the parallel arms of each of the U sections are spaced from each other a sufficient distance to permit the overlying beam member to move between the arms when the structure is folded as shown in Fig. 4 of the drawings, and in order to prevent said beams from dropping into said U members when the stand is set up for use, a plate 16 is rigidly secured to the lower face of said channels in such position as to overlie the U members when the structure is unfolded, as shown in Fig. 6 of the drawings, the said plate obviously assuming a position removed from the U members when the stand is folded to permit entrance thereinto of the channels 14 and 14*a* respectively.

A bracket structure designated generally as 17 and comprising opposed L members 18 disposed at each side of each of the lowermost beams 13 is pivotally mounted on a rod 19 extending through the said beams 13 transversely with respect thereto, the said bracket 17 constituting a support for the beam 13 when the structure is in the set up position, and pivoting to a position at the side of the beams when the stand is folded. It is pointed out at this time that the pivoting of the bracket 17 to its respective positions set forth above, is accomplished solely by the force of gravity acting thereon.

A member 20, preferably in the form of a structural angle is pivotally mounted at the upper end of each of the vertically disposed structural members 2 and the vertically disposed flange thereof is provided with a longitudinal slot 21 arranged to receive a projecting pin 22 secured at the upper end and projecting outwardly from a structural member 23, the lower end of said member 23 being pivotally mounted as at 24 to the upstanding flange or arm 25 of the structural member 26, rigidly secured on the upper face of the uppermost hinged beam 11 and extending rearwardly beyond the inner end thereof. A kick plate 27 is rigidly secured on the structural member 23, the purpose for which will be set forth at length hereinafter.

Figure 3:
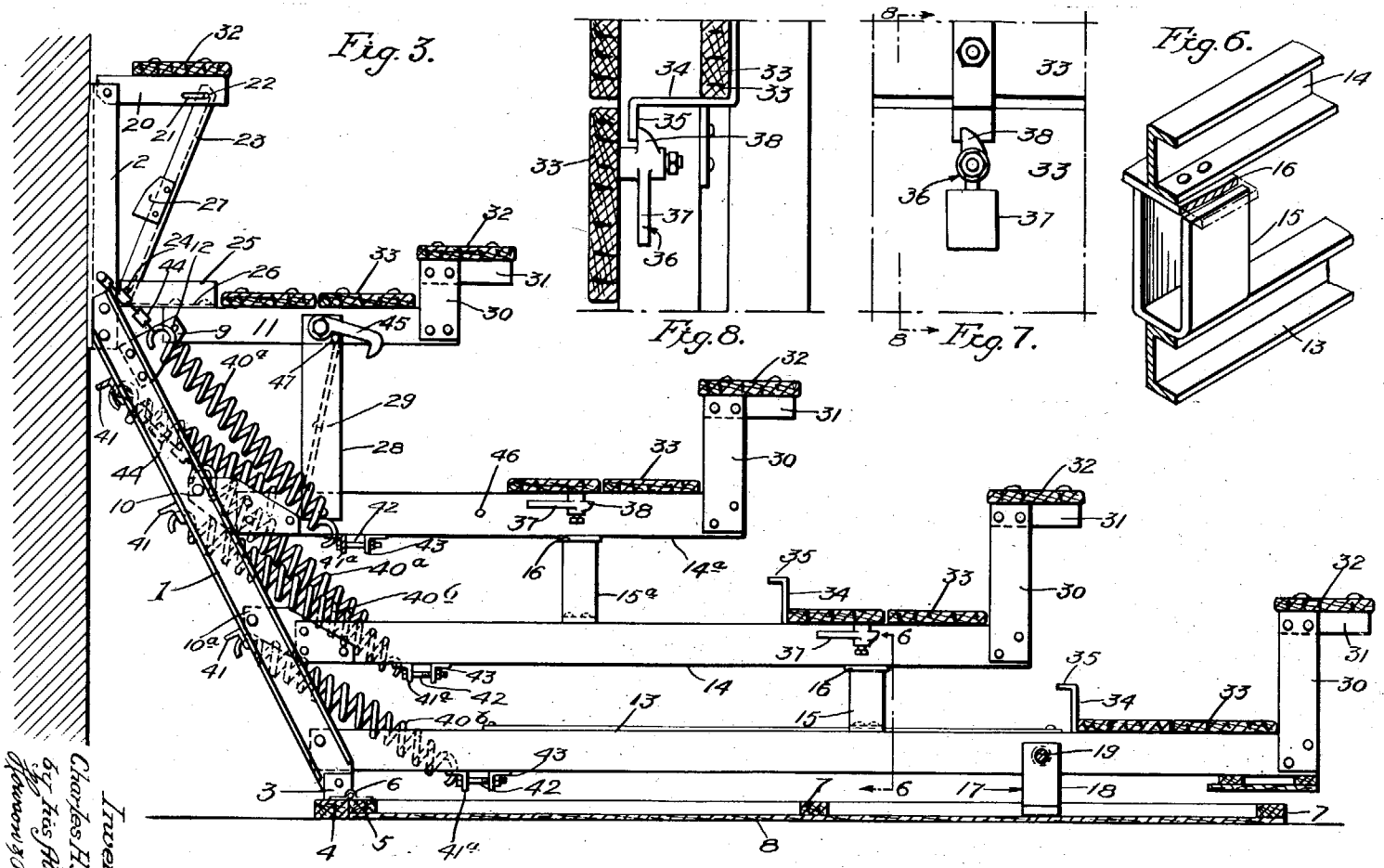
Fig. 3 is a view in section on line 3—3, Fig. 2.

A structural member in the form of a plate 28 is pivotally connected at each of its ends to the beams 11 and 14*a* respectively and positioned relatively with respect to said members as shown in Fig. 3 of the drawings and this plate 28 is provided with an obliquely positioned rib 29 for the purpose of substantially increasing the rigidity of said member 28 but which must be positioned obliquely as shown to enable the structure to be folded in a substantially small, compact area.

A structural plate 30 is rigidly secured adjacent the outer ends of each of the projecting beams 13, 14, 14*a* and 11 in such a manner that said plates 30 will at all times reside in a position normal to the said channel members. At the opposite end of each of the structural plates 30 an angle or other suitable structural member 31 is rigidly secured in a position normal to said plates and parallel with respect to each of the aforementioned channel members. In the present instance boards 32 or other structural means having a substantially solid surface constituting seats, are secured in overlying relation with respect to the members 30 and each of the members 31.

Board sections 33 constituting foot rests are rigidly secured upon the upper face of each of the beams 11, 13, 14 and 14*a* and in the present instance a bracket 34 is secured below the foot rest sections 33 on the beams 13 and 14 and extends rearwardly with respect thereto to a height above the upper surface of said boards 33 where the end portion thereof is formed parallel to the surface of the latter as at 35 to form a lug. A locking device comprising a pivotally mounted body 36 is mounted below the foot rest sections 33 on the beams 14 and 14*a* as in Fig. 3 and these locking devices are provided with counterweights 37 and lugs 38, the said locking devices being positioned with respect to the structure as a whole so that when said structure is folded as shown in Fig. 4, the lug 35 of the bracket 34 will be in position to be engaged by the lug 38 of the locking device and maintain the structure in the folded position as shown in Fig. 4 of the drawings.

In the present instance, for the purpose of rendering the successive stringer sections substantially rigid with respect to one another, these sections are preferably connected by means of diagonal strut members 39, the ends of which are secured to the adjacent bottom beam members of the respective stringer members.

A further feature of the invention is present in the novel arrangement of a number of substantially heavy coil springs 40 suspended in paired groups between the stringer members 1 and each pivotally mounted beam member 13, 14 and 14*a* inclusive, for the purpose of enabling the grandstand structure to be set up or folded by a single person.

It will be noticed from a study of Figs. 2 and 3 of the drawings that each beam member is provided with a pair of these springs each of which is disposed at a different angle from the other as springs 40*a* and 40*b* in Fig. 3. The springs 40*b* which are at a smaller angle with respect to the horizontal than the springs 40*a* are directly connected at their upper extremities to longitudinal rods or angles 41 secured to the rear face of the stringer members 1 and at their other ends to angles or rods 41*a* which are indirectly connected to the pivotally mounted beams by means of bolts 42 engaging said angles 41*a* and similar structural members 43 secured rigidly to the under sides of the beams. This latter means of connecting the lower ends of the springs 40*b* to the beams has been found desirable for the purpose of enabling adjustment of the spring tension to insure proper action on the pivotably mounted structure.

The lower ends of the greater inclined springs 40*a* are secured similarly to the adjustable bar 41*a* but it should be noted that the upper ends thereof are not connected directly to the longitudinal rods 41 but are provided with intermediate smaller chain sections 44 to permit the stand structure to be folded into the small compact space shown in Fig. 4 of the drawings.

The springs 40*b* disposed at the smaller angle to the horizontal check the fall thereof, due to the weight thereof for the first part of the unfolding or setting up of the stand and the springs 40*a* at the greater angle check the fall during the later part of the setting up operation, the said springs also functioning to aid the operator in folding up the structure when not in use.

It will be noted that when the grandstand is folded as in Fig. 4, the structural member 23 is locked in a position off center and in order to kick the said member 23 outwardly from the strut 2 and permit unfolding of the structure the kick plate 27, referred to before, is mounted on the member 23 as shown in Fig. 4 of the drawings.

It has been found that the particular lock means 35 employed in the instance of the beams 14 and 14*a* is ineffective to secure the lower group of beams to the uppermost beam 11 in folded relation, and to avoid this difficulty a novel drop lock 44 is pivoted on the said beam 11 and arranged to engage a projecting pin 46 on the next lower beam 14*a*, the pivotal movement of the lock member 45 being limited in extent by means of a projecting lug 47.

The structure may comprise any desired number of stringer sections and rows or tiers of seats to provide a stand to meet particular seating requirements. A particular feature of the structure is present in the ease with which the stand may be set up or folded and it is pointed out that the stand may be set up with only the lowermost seat, or two or three as may be needed, the remainder of the stand being maintained in its folded relation by means of the novel individual tier locking means provided.

The provision of the base panelling 10 has been provided primarily for the purpose of rendering a covering for the structure when in the folded position and hiding the structural members from view.

The particular structural detail involved has been set forth for the purpose of description, but it is not intended, however, that the invention be limited thereto except as is without the scope of the appended claims.

What is claimed is:

1. In a folding structure, a plurality of stringers constituting supports for a plurality of pivotally mounted superimposed beams, a bracket pivotally mounted on the lowermost beam for positioning the latter substantially horizontal, U members predeterminedly secured to certain of the successively superimposed beams, a plate rigidly secured to certain of the beams in predetermined position so that when the beams are in a substantially horizontal position, said plate will overlie said U members and maintain said beams in parallel spaced relation with respect to each other and permit the next higher beam to pass inwardly of said U members when in the vertical position so that the beams will reside in compact, nest-like relation, seat and foot rest sections supported by said beams, a bracket having a projecting tongue mounted in a predetermined position on certain of said foot rest sections, and a pivotable member having a counter weight and a projecting lug mounted below certain of said foot rest sections, said member being predeterminedly positioned with respect to the bracket to permit engagement of the tongue by said lug when the structure is folded to lock said structure in the latter relation.

2. In a folding structure, a plurality of stringers, each constituting a support for a plurality of beams pivotally mounted in superimposed spaced relation, said beams being arranged for positioning in a substantially horizontal or vertical position, means mounted on the beams for maintaining said beams in parallel spaced relation in the former position, and permitting positioning thereof in compact nest-like relation in the latter position, means associated with certain of said beams and engaging means associated with the next lower beam for locking the structure in the latter position, and sets of springs disposed intermediate the stringers and the beams at different angles to facilitate folding and setting up of the structure.

3. In a folding structure, a plurality of stringers constituting supports for a plurality of pivotally mounted superimposed beams, a bracket pivotally mounted on the lowermost beam for positioning the latter substantially horizontal, U members predeterminedly secured to certain of the successively superimposed beams, a plate rigidly secured to certain of the beams in predetermined position so that when the beams are in a substantially horizontal position, said plate will overlie said U members and maintain said beams in parallel spaced relation with respect to each other, and permit the next higher beam to pass inwardly of said U members when in the vertical position so that the beams will reside in compact, nest-like relation, seat and foot rest sections supported by said beams, a bracket having a projecting tongue mounted in a predetermined position on certain of said foot rest sections, a pivotable member having a counter weight and a projecting lug mounted below certain of said foot-rest sections, said member being predeterminedly positioned with respect to the bracket to permit engagement of the tongue by said lug when the structure is folded to lock said structure in the latter relation, and sets of springs disposed intermediate the stringers and the beams at different angles to facilitate folding and setting up of the structure.

4. In a folding structure, a plurality of stringers constituting supports for a plurality of pivotally mounted superimposed beams, a bracket pivotally mounted on the lowermost beam for positioning the latter substantially horizontal, U members predeterminedly secured to certain of the successively superimposed beams, a plate rigidly secured to certain of the beams in predetermined position so that when the beams are in a substantially horizontal position, said plate will overlie said U members and maintain said beams in parallel spaced relation with respect to each other, and permit the next higher beam to pass inwardly of said U members when in the vertical position so that the beams will reside in compact, nest-like relation, seat and foot rest sections supported by said beams, a bracket having a projecting tongue mounted in a predetermined position on certain of said foot rest sections, a pivotable member having a counter weight and a projecting lug mounted below certain of said foot-rest sections, said member being predeterminedly positioned with respect to the bracket to permit engagement of the tongue by said lug when the structure is folded to lock said structure in the latter relation, and sets of springs disposed intermediate the stringers and the beams to facilitate folding and setting up of the structure.

5. In a folding structure a plurality of pivotally mounted superimposed beams, a bracket pivotally mounted on the lowermost beam for positioning the latter substantially horizontal, members predeterminedly secured to certain of the successively superimposed beams, a means rigidly secured to certain of the beams in predetermined relation so that when said beams are in a substantially horizontal position said means will overlie the members and maintain the beams in parallel spaced relation with respect to each other, and permit the next higher beam to pass inwardly of said members when in the vertical position, in compact, nest-like relation, seat and foot rest sections mounted on said beams, a bracket having a projecting tongue mounted in a predetermined position on certain of said foot rest sections and a pivotable member having a counter-weight and a projecting lug portion mounted below others of said foot rest sections, said member being predeterminedly positioned with respect to the bracket to permit engagement of the tongue by said lug when the structure is folded.

6. In a grandstand, a supporting structure for a bank of a plurality of rows of seats including a plurality of stringers each constituting a support for a plurality of seat supporting beams, said beams being pivotal to substantially horizontal and vertical positions, and means between each of the beams for maintaining the same in parallel spaced relation in the first mentioned position.

7. In a grandstand, a supporting structure for a bank of a plurality of rows of seats including a plurality of stringers each constituting a support for a plurality of seat supporting beams, said beams being pivotal to substantially horizontal and vertical positions, means between each of the beams for maintaining the same in parallel spaced relation in the first mentioned position, and means for locking the beams in the vertical position.

8. In a grandstand, a supporting structure for a bank of a plurality of rows of seats including a plurality of sets of respectively superimposed seat supporting beams, said beams being arranged for positioning in a substantially horizontal and vertical position, and means between each of said beams for maintaining the same in parallel spaced relation in the former position and permitting positioning thereof in compact nest-like relation in the vertical position.

9. In a grandstand, a supporting structure for a bank of a plurality of rows of seats including a plurality of sets of respectively superimposed seat-supporting beams, said beams being arranged for positioning in a substantially horizontal and vertical position, means between each of said beams for maintaining the same in parallel spaced relation in the former position and permitting positioning thereof in compact nest-like relation in the vertical position, and means for locking the beams in said latter position.

10. In a grandstand, a supporting structure for a bank of a plurality of rows of seats including a plurality of sets of respectively superimposed seat-supporting beams, said beams being arranged for positioning in a substantially horizontal and vertical position, means between each of said beams for maintaining the same in parallel spaced relation in the former position and permitting positioning thereof in compact nest-like relation in the vertical position, and means associated with certain of said beams and engaging means associated with the next lower beam for locking the structure in the latter position.

11. In a grandstand, a supporting structure for a bank of a plurality of rows of seats including a plurality of stringer members each constituting a support for a plurality of seat supporting beams, said beams being pivotal to a substantially horizontal and vertical position, and sets of springs connected intermediate the stringers and the beams to facilitate folding and setting up of the structure.

12. In a grandstand, a supporting structure for a bank of a plurality of rows of seats including a plurality of sets of pivotably mounted superimposed seat-supporting beams arranged for positioning in a substantially horizontal and vertical position, means between each of the beams for maintaining the same in parallel spaced relation in the former position, and permitting positioning in compact nest-like relation in the vertical position, means associated with certain of said beams and engaging means associated with the next lower beam for locking the structure in the latter position, and sets of springs connected between certain of the beams to facilitate folding and setting up of the structure.

13. In a grandstand, a supporting structure for a bank of a plurality of rows of seats including a plurality of groups of respectively superimposed seat supporting beams, each of said beams being pivotable to substantially horizontal and vertical positions, and seat sections supported by the corresponding beams in each parallel group.

14. In a grandstand, a supporting structure for a bank of a plurality of rows of seats including a plurality of groups of relatively superimposed seat supporting beams, each of said beams being of relatively shorter length than the next lower beam and pivotable to substantially horizontal and vertical positions, and seat sections supported by the corresponding beams in each parallel group.

15. In a grandstand, a supporting structure for a bank of a plurality of rows of seats including a plurality of spaced parallel stringer members each constituting a support for a plurality of respectively superimposed beams, each of said beams being pivotable to substantially horizontal and vertical positions, and means connecting the corresponding beams of each set so that the same may be pivoted simultaneously as a unit.

16. In a grandstand, a supporting structure for a bank of a plurality of rows of seats including a plurality of sets of respectively superimposed beams, each of said beams being pivotable to substantially horizontal and vertical positions, and means connecting the corresponding beams of each set so that the same may be pivoted simultaneously as a unit.

17. In a folding structure a plurality of pivotally mounted superimposed beams, a bracket pivotally mounted on the lowermost beam for positioning the latter substantially horizontal, members predeterminedly secured to certain of the successively superimposed beams, and a means rigidly secured to certain of the beams in predetermined relation so that when said beams are in a substantially horizontal position said means will overlie the members and maintain the beams in parallel spaced relation with respect to each other, and permit the next higher beam to pass inwardly of said members when in the vertical position, in compact, nest-like relation.

18. In a grandstand, a supporting structure for a bank of a plurality of rows of seats including parallel groups of respectively superimposed seat-supporting beams, each of said beams being pivotable to a substantially horizontal and vertical position.

19. In a folding grandstand or the like, a bank of seat supports pivoted at their inner ends to swing from vertical to horizontal positions and bearing seats at their outer ends, the pivots of said seat supports being vertically and horizontally spaced through such distances that the supports when in vertical position are in closely confronting relation with the seats thereof in close vertically stacked relation, and when in horizontal position the seat supports are well spaced vertically from one another, and the seats thereof are well spaced horizontally.

20. In a folding grandstand or the like, a bank of seat supports pivoted at their inner ends to swing from vertical to horizontal positions and bearing seats at their outer ends, the pivots of said seat supports being vertically and horizontally spaced through such distances that the supports when in vertical position are in closely confronting relation with the seats thereof in close vertically stacked relation, and when in horizontal position the seat supports are well spaced vertically from one another, and the seats thereof are well spaced horizontally, and connections between the seat supports whereby the bank may be moved as a unit from one to the other of said positions.

21. In a folding grandstand or the like, a bank of seat supports pivoted at their inner ends to swing from vertical to horizontal positions and bearing seats at their outer ends, the pivots of said seat supports being vertically and horizontally spaced through such distances that the supports when in vertical position are in closely confronting relation with the seats thereof in close vertically stacked relation, and when in horizontal position the seat supports are well spaced vertically from one another, and the seats thereof are well spaced horizontally, and connections between the seat supports whereby the bank may be moved as a unit from one to the other of said positions, said connections having operative engagement with seat supports limiting the approach of said seat supports in horizontal position.

22. In a folding grandstand or the like, a plurality of parallel seat supports each supporting a seat, and pivotal connections for and between said supports, said connections being so constructed and arranged that said supports may swing as a unit between limits spaced 90° apart while maintaining their parallel relation and the supports approach one another when moved from one toward the other of said limits and separate when moved in the opposite direction.

23. In a folding structure, a plurality of pivotally mounted seat supports, a seat fixed to each support, a seat pivoted above the inner end of the uppermost support, means connecting said seat supports whereby they may be simultaneously swung about the pivots thereof from a horizontal operative position to a vertical inoperative position, and means connecting said pivoted seat and one of said seat supports whereby the pivoted seat is swung about its pivot from operative to inoperative position simultaneously with said seat supports, said pivoted seat in its inoperative position confronting the upper seat support below the seat thereof.

24. In a folding grandstand or the like, standards, a seat pivoted thereto to move from a vertical inoperative position to a horizontal operative position, a seat-supporting structure pivoted to said standards for movement from a vertical inoperative to a horizontal operative position, and connections between said seat and seat support constructed and arranged to shift the seat from operative to inoperative position as the seat support is similarly moved while rotating the seat in the opposite direction to the seat support.

25. In a folding grandstand or the like, a bank of seat supports pivoted at their inner ends to swing from vertical to horizontal positions and bearing seats in raised relation to their outer ends, and foot supports on their upper surfaces near their outer ends, the pivots of said seat supports being vertically and horizontally spaced through such distances that the supports when in vertical position are in closely confronting relation with the seats thereof in close vertically stacked relation in which the seat of each support is in overlapping relation to the foot support of the next lower seat support of the bank, and when in horizontal position the seat supports are well spaced vertically from one another, and the seats thereof are well spaced horizontally and no longer overlap the foot supports.

26. A device as claimed in claim 25 wherein there are connections between the seat supports whereby the bank may be moved as a unit from one to the other of said positions.

27. A device as claimed in claim 25 wherein there are connections between the seat supports whereby the bank may be moved as a unit from one to the other of said positions and said connections have operative engagement wtih seat supports limiting the approach of said seat supports.

28. A device as claimed in claim 19 wherein there is a seat pivoted above the inner end of the uppermost support, means connecting said pivoted seat and one of said seat supports whereby the pivoted seat is swung about its pivot from operative to inoperative position simultaneously with said seat supports, said pivoted seat in its inoperative position confronting the upper seat support below the seat thereof.

29. A device as claimed in claim 20 wherein there is a seat pivoted above the inner end of the uppermost support, means connecting said pivoted seat and one of said seat supports whereby the pivoted seat is swung about its pivot from operative to inoperative position simultaneously with said seat supports, said pivoted seat in its inoperative position confronting the upper seat support below the seat thereof.

30. A device as claimed in claim 21 wherein there is a pivoted seat above the uppermost seat support of the bank and means are provided connecting said pivoted seat and one of said seat supports whereby the pivoted seat is swung about its pivot from operative to inoperative position simultaneously with said seat supports, said pivoted seat in its inoperative position confronting the upper seat support below the seat thereof.

31. A device as claimed in claim 25 wherein there is a pivoted seat above the uppermost seat support of the bank and means are provided connecting said pivoted seat and one of said seat supports whereby the pivoted seat is swung about its pivot from operative to inoperative position simultaneously with said seat supports, said pivoted seat in its inoperative position confronting the upper seat support below the seat thereof.

32. In a folding grandstand or the like, standards, a seat pivoted thereto to move from a vertical inoperative position to a horizontal operative position, a seat-supporting structure pivoted to said standards for movement from a vertical inoperative to a horizontal operative position, and a link pivoted to said seat and seat support, the pivots of the link being disposed at opposite sides of the pivots of the seat and seat support whereby rotation of the seat support from one to the other of its positions similarly shifts the seat while rotating the seat in the opposite direction.

33. In a grandstand, a supporting structure for a bank of a plurality of rows of seats including parallel groups of respectively superimposed seat-supporting beams, each of said beams being pivotable to a substantially horizontal and vertical position, and means connecting said groups whereby they may be moved from one to another of said positions as a unit.

34. In a grandstand, a supporting structure for a bank of a plurality of rows of seats including a plurality of groups of respectively superimposed seat supporting beams, each of said beams being pivotable to substantially horizontal and vertical positions, seat sections supported by the corresponding beams in each parallel group, and means connecting said groups whereby they may be moved from one to another of said positions as a unit.

35. In a folding grandstand or the like, a bank of parallel seat supports movable as a unit from horizontal to vertical position and connections between the seat supports so constructed and arranged that the supports are caused to approach one another while maintaining their parallel relation as the bank is moved from horizontal to vertical position and are simultaneously shifted longitudinally with relation to the lower seat support of the bank whereby seats carried by said seat supports may be disposed in closely stacked relation when the unit is vertically disposed.

36. In a folding grandstand or the like, a bank of parallel seat supports movable as a unit from horizontal to vertical position and connections between the seat supports so constructed and arranged that the supports are caused to approach one another while maintaining their parallel relation as the bank is moved from horizontal to vertical position.

37. In a folding grandstand or the like, a bank of seat supports pivoted to swing from vertical to horizontal positions and bearing seats in raised relation to their outer ends, and foot supports on their upper surfaces near their outer ends, the pivots of said seat supports being so constructed and arranged that the supports when in vertical position are in closely confronting relation with the seats thereof in close vertically stacked relation in which the seat of each support is in overlapping relation to the foot support of the next lower seat support of the bank, and when in horizontal position the seat supports are well spaced vertically from one another, and the seats thereof are well spaced horizontally and no longer overlap the foot supports.

38. A device as claimed in claim 37 wherein there are connections between the seat supports whereby the bank may be moved as a unit from one to the other of said positions.

39. A device as claimed in claim 37 wherein there are connections between the seat supports whereby the bank may be moved as a unit from one to the other of said positions and said connections have operative engagement with seat supports limiting the approach of said seat supports.

40. A device as claimed in claim 37 wherein there is a pivoted seat above the uppermost seat support of the bank and means are provided connecting said pivoted seat and one of said seat supports whereby the pivoted seat is swung about its pivot from operative to inoperative position simultaneously with said seat supports, said pivoted seat in its inoperative position confronting the upper seat support below the seat thereof.

CHARLES H. WETZEL.